Patented July 12, 1949

2,475,980

UNITED STATES PATENT OFFICE 2,475,980

LIGHT-SENSITIVE PIPERINE COMPOSITIONS

Alexander Murray, Rochester, N. Y., assignor to Eastman Kodak Company, Rochester, N. Y., a corporation of New Jersey No Drawing. Application April 15, 1946, Serial No. 662,409

6 Claims. (Cl. 95—7)

This invention relates to a new light-sensitive material and more particularly to a monomeric composition that is converted by light into a resinous polymer.

I have found that photosensitivity is possessed by carboxylic acid salts of many nitrogen bases, provided (a) that the bases or the acids or both contain ethylene linkages, and (b) that the system has a strong absorption for part or all of the exposing radiation. While light sensitivity is inherent in these compounds, peroxides or other addenda may increase such sensitivity. The sensitivity of these salts is frequently many times that of the bases. Specific sensitive compounds may be classified according to the types of nitrogen bases from which they are derived, e. g. amines, amides, amine oxides, Schiff's bases, anhydro bases, nitrosamines, diazo compounds, etc. It has been found that the carboxylic acid salts of certain nitrogen bases containing ethylenic linkages polymerize under the influence of heat or light, or both, to provide a light-sensitive substance useful in photomechanical processes.

It is, therefore, an object of my invention to provide a new synthetic resin. A further object is to provide a monomeric composition which is converted by light into a resinous polymer. A still further object is to provide a photomechanical process employing such light-sensitive substances.

I have discovered that the amide formed by reacting piperic acid and piperidine (reaction product piperine) is converted by the action of actinic radiation, such as heat or light or both, into a resinous material which I have named "piperite." An accelerator such as benzoyl peroxide may or may not be used. Piperine is prepared by reacting an unsaturated carboxylic acid, piperic acid, with a cyclic nitrogen base, piperidine, according to the following reaction:

Piperite may be prepared from piperine by reacting piperine in the presence of heat and an accelerator.

Example 1

Four parts by weight of piperine and one part of benzoyl peroxide are dissolved in a volatile solvent which is then evaporated. The residual mixture is heated to 115° C. from 5 to 20 minutes and cooled. The product is yellow, glossy, clear, hard, tough, with good resistance to alkalis and acids, and is insoluble in water or petroleum oils. It adheres strongly to glass and is not displaced therefrom by water. For optimum effectiveness, the benzoyl peroxide is used in quantities of from 20 to 33⅓ per cent.

Instead of employing heat to polymerize the piperine, initial polymerization may be carried out by exposure to light in the presence of an accelerator. Under the influence of light, the viscous, fluid monomer is converted into a relatively soft, solid resin, which is further hardened by a brief heat treatment. When produced in glass, regenerated cellulose, etc., the photomorph is non-stripping in the presence of water. Benzoyl peroxide is the preferred accelerator and is odorless in the mixture.

Piperine may be employed in photomechanical processes in the following manner:

Example 2

An ethylene dichloride solution of piperine having the following composition was prepared:

|  | Grams |
|---|---|
| Piperine | 4 |
| Benzoyl peroxide | 1 |
| Ethylene dichloride | 60 |

The ingredients will dissolve at room temperature.

The accelerator was mixed with the resin

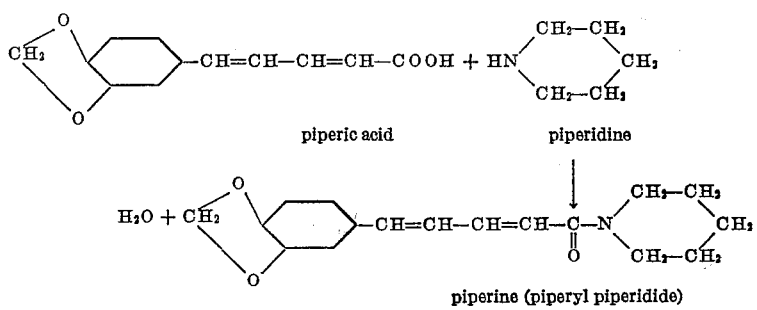

piperine (piperyl piperidide)

former on the day the solution was to be used. The solution was applied to the surface to be sensitized and when the solvent evaporated, a slowly crystallizing, viscous fluid was obtained. In this condition it was highly sensitive to light as compared with bichromated colloids or alketone resists. When exposed to light, is solidified to a clear glaze, free from "tack." Solidification required from 1 to 10 seconds, depending upon the thickness of the coating, using as a light source a 35-ampere white flame arc 18 inches distant, the radiation passing through a cover glass .087" thick. A total exposure equal to three times the solidification exposure produced a photomorph that was strong enough to withstand swabbing with soap and water which washed away the unexposed areas. One-second exposures on thin coatings have also been developed, but the image was weak and imperfect.

Exposures were made by projection or in contact with oil, e. g. white mineral oil. The coating and the photomorph are virtually insoluble in petroleum fractions. Wash-off prints were developed by swabbing with soap and water.

After development, the photomorph was converted into a fairly hard resin, having good resistance to aqueous etching reagents, by heating, e. g. 5 minutes at 115° C. This treatment will not injure zinc or cellulose acetate. After its purpose has been served, the piperite resist may be easily removed by glycol, ethanol, or many other solvents.

Instead of having free piperine in the light-sensitive composition, I may also employ light-sensitive salts of piperine by themselves. These, too, are not readily dispersed in petroleum fractions, but the unexposed areas of a coating can be slowly rubbed away with a cotton swab and kerosene, leaving the photomorph unaffected. Such salts may include the citrate, benzoate, cinnamate, oleate, and abietate. Dibenzoyl peroxide forms salt-like compounds with nitrogen bases, such as piperine, which differ from the corresponding benzoates.

*Example 3*

Two moles of piperine were combined with 1 mole of dibenzoyl peroxide, or 2.4 parts to 1 part, and this repeated the excellent results obtained in Example 2 where piperine and benzoyl peroxide were used in the ratio 4 to 1.

The fact that the 4 to 1 mixture may contain 42% of free base, and gives satisfactory results, indicates that a proportion of free base may, in certain cases, modify the physical properties of the coating favorably, e. g. in its reaction to developing agents.

*Example 4*

One mole of piperine was confined with ⅓ mole of citric acid, or

| | Grams |
|---|---|
| Piperine | 4.5 |
| Citric acid | 1 |
| Ethyl alcohol | 80 |

This gave a solid, resinous coating, which showed a marked decrease in solubility after exposure to light. It was developed slowly by swabbing with kerosene.

*Example 5*

One mole of piperine was combined with 1 mole of benzoic acid, or

| | Grams |
|---|---|
| Piperine | 2.3 |
| Benzoic acid | 1 |
| Methyl Cellosolve | 60 |

The crude piperine salts all give clear, non-crystalline coatings from solvents, ranging from oils, such as piperine oleate, to non-tacky solids, such as piperine citrate and piperine abietate. The citrate is not far below the benzoyl peroxide salt in sensitivity, and seemed to be improved by hydrogen peroxide treatment. All of the above mentioned piperine salts gave a similar yellow "glass" when baked at 120° C.

The piperine process appears to be peculiarly adapted to photoceramics, the photoengraving of glass, the operation on cellulose acetate, lithography, projection printing of photomechanical plates, and etching with alkalies. The process is generally applicable to nearly all photoengraving methods.

I claim:

1. A light-sensitive photographic material adapted for use in photomechanical processes, said material comprising piperine and benzoyl peroxide.

2. A light-sensitive photographic material adapted for use in photomechanical processes, said material comprising piperine, benzoyl peroxide and ethylene dichloride.

3. The method of forming a photographic relief image, which comprises coating on a support a sensitive material selected from the group consisting of piperine, organic acid salts of piperine, together with a peroxide accelerator, exposing said material to light under an image, and washing away the unexposed parts of said material.

4. The method of forming a photographic relief image, which comprises coating on a support a sensitive material comprising organic acid salt of piperine and a peroxide accelerator, exposing said material to light under an image, and washing away the unexposed parts of said material.

5. The method of forming a photographic relief image, which comprises coating on a support a sensitive material comprising piperine and benzoyl peroxide, exposing said material to light under an image, and washing away the unexposed parts of said material.

6. A light-sensitive photographic material adapted for use in photomechanical processes, said material comprising a peroxide accelerator and a material of the group consisting of piperine and organic acid salts of piperine.

ALEXANDER MURRAY.

REFERENCES CITED

The following references are of record in the file of this patent:

UNITED STATES PATENTS

| Number | Name | Date |
|---|---|---|
| 1,965,710 | Murray | July 10, 1934 |
| 2,161,737 | Coleman et al. | June 6, 1939 |

FOREIGN PATENTS

| Number | Country | Date |
|---|---|---|
| 775 | Great Britain | 1882 |

OTHER REFERENCES

Hackh's Chemical Dictionary — Hackh & Grant—second edition, 1937; published by P. Blakiston's Son & Co. Inc., Philadelphia, Pennsylvania, pp. 728 and 729.